(12) United States Patent
Atteia et al.

(10) Patent No.: US 11,764,692 B2
(45) Date of Patent: Sep. 19, 2023

(54) DC TO DC BOOST CONVERTER

(71) Applicant: Ururaki Inc, Mississauga (CA)

(72) Inventors: Mahdi S. Atteia, Mississauga (CA);
Drew A. Camilucci, Mississauga (CA);
Mhamad Salih, Mississauga (CA)

(73) Assignee: Ururaki Inc, Mississauga (CA)

( * ) Notice: Subject to any disclaimer, the term of this patent is extended or adjusted under 35 U.S.C. 154(b) by 0 days.

(21) Appl. No.: 17/377,026

(22) Filed: Jul. 15, 2021

(65) Prior Publication Data
US 2022/0021310 A1 Jan. 20, 2022

Related U.S. Application Data

(60) Provisional application No. 63/052,091, filed on Jul. 15, 2020.

(51) Int. Cl.
*H02M 3/335* (2006.01)
*H02M 1/14* (2006.01)
*H02M 1/12* (2006.01)
*H02M 1/00* (2006.01)

(52) U.S. Cl.
CPC ..... *H02M 3/33573* (2021.05); *H02M 1/0077* (2021.05); *H02M 1/126* (2013.01); *H02M 1/14* (2013.01)

(58) Field of Classification Search
CPC .. H02M 3/335; H02M 3/33573; H02M 1/126; H02M 1/14
USPC .......................................................... 363/65
See application file for complete search history.

(56) References Cited

U.S. PATENT DOCUMENTS

| 5,414,609 A * | 5/1995 | Levran | H02J 9/062 363/25 |
| 5,434,770 A * | 7/1995 | Dreifuerst | H02J 1/102 363/27 |
| 5,636,110 A * | 6/1997 | Lanni | H01R 13/6675 363/21.08 |
| 2018/0369864 A1* | 12/2018 | Lei | G01N 29/225 |
| 2020/0059102 A1 | 2/2020 | Brombach et al. | |
| 2020/0211756 A1 | 7/2020 | Wu et al. | |
| 2021/0075333 A1* | 3/2021 | Rivas-Davila | H02M 1/0095 |

FOREIGN PATENT DOCUMENTS

| CN | 106972753 | 7/2017 |
| CN | 111312490 | 6/2020 |

OTHER PUBLICATIONS

CREE Inc: "How to use SiC to reduce the system cost in power applications"; Compelfest 2014. Copyright 2013. (Year: 2013).*

(Continued)

*Primary Examiner* — Gary L Laxton
(74) *Attorney, Agent, or Firm* — Faegre Drinker Biddle & Reath LLP

(57) ABSTRACT

A DC to DC boost converter for boosting low voltage power to levels for MVDC and HVDC transmission. The DC to DC boost converter comprises a bridge converter configured to receive a direct current (DC) input and to generate a resultant alternating current (AC) output, the bridge converter comprising a high-speed semiconductor switch bridge; a transformer configured to receive and step up the AC output of the bridge converter; and a rectifier configured to convert the stepped up AC output to pulsating DC output.

26 Claims, 6 Drawing Sheets

(56) References Cited

OTHER PUBLICATIONS

International Search Report and Written Opinion received for PCT Patent Application No. PCT/CA2021/050975, dated Sep. 24, 2021.
Large Scale Photovoltaic Generation System Connected to HVDC Grid with Centralized High Voltage and High Power DC/DC Converter. Dated Aug. 31, 2021.
International Search Report and Written Opinion received for PCT Patent Application No. PCT/CA2021/050981, dated Sep. 20, 2021.
International Search Report and Written Opinion received for PCT Patent Application No. PCT/CA2022/050411, dated May 26, 2022.
A DC-DC Conversion System for High Power HVDC-Connected Photovoltaic Power System. Dated 2017; Downloaded Aug. 9, 2022.
Multi-Modular Cascaded DC-DC Converter for HVDC Grid Connection of Large Scale Photovoltaic Power System. Dated 2013; Downloaded Aug. 9, 2022.
LLC Resonant Type Boost Converter for HVDC Interconnection of PV Generation Facility. Dec. 2017.

\* cited by examiner

DC TO DC BOOST CONVERTER

CROSS-REFERENCE TO RELATED APPLICATION

This application claims the benefit of U.S. Provisional Application No. 63/052,091 filed on Jul. 15, 2020, the entire contents of which are incorporated herein by reference.

FIELD

The subject disclosure relates to a direct current (DC) to DC boost converter.

BACKGROUND

High frequency switch-mode power supplies (SMPSs) that employ electronic DC to DC boost converters are widely used in many electronic products today because of their ability to efficiently step-up (boost) or step-down (buck) a DC input voltage. These switch-mode power supplies can also actively adjust the timing sequence or pulse-width modulation of their transistors' switching operation to match real-time changes in a load while stabilizing the DC output voltage. These characteristics make switch-mode power supplies a common choice within the consumer electronics industry, where boosted DC output voltages remain below 1 kV.

For example, turning now to FIG. 1, a conventional DC to DC boost converter is shown and is generally identified by reference character 25. The DC to DC boost converter 25 can be used in a variety of applications to power components which operate at low voltages, such as X-ray equipment, regulated power supplies, motor drive units, and aircraft systems to name a few.

As can be seen, the DC to DC boost converter 25 comprises an input section 30 having a pair of input terminals to receive the DC input voltage. For battery powered devices, the DC input voltage is typically in the range of 12V to 48V, and for heavy equipment, the DC input voltage is typically in the range of 120V to 480V. The transmitted power varies by application, and can range from 1 kW to 65 kW. An input filter and voltage stabilizer section 31 is connected to and receives the DC input voltage from the input section 30. The input filter and stabilizer section 31 comprises a bank of capacitors 36 and an electromagnetic interference (EMI) filter 38, which is used to filter harmonics and stabilize the DC input voltage. A bleed resistor 37, electrically connected in parallel with the bank of capacitors 36, is used to discharge the capacitor bank slowly, such that the DC to DC boost converter 25 fully discharges after turning off.

The filtered and stabilized DC voltage is fed to a full bridge converter section 32, which comprises four (4) semiconductor switches such as insulated-gate bipolar transistors (IGBTs) or metal oxide semiconductor field effect transistors (MOSFETs) 40 in an H-bridge configuration, and a gate driver 39 for each semiconductor switch 40. Full bridge converter section 32 uses the DC rails to generate a square wave that is fed into the primary side of a boost transformer 41 forming part of a boost transformer and rectifier section 33. The semiconductor switches 40 can operate in a hard-switch or soft-switch mode to deliver power efficiently to the boost transformer 41.

The boost transformer 41 has the necessary turns ratio to boost the voltage of the square wave to the required level, and a core size to handle the power level. A rectifier is connected to the secondary side of the boost transformer 41 and converts the square wave output of the boost transformer 41 to pulsating DC. The rectifier comprises two diodes 42, each of which is connected to a respective terminal of the secondary side of the boost transformer 41. The secondary side of the boost transformer 41 also comprises a center tap, which functions as the common.

The pulsating DC output of the rectifier is applied to an output filter and voltage stabilizer section 34. The output filter and stabilizer section 34 comprises a capacitor 43 and an EMI filter 45, which is used to filter harmonics and stabilize the pulsating DC. A bleed resistor 44 is electrically connected in parallel with the capacitor 43 to discharge the capacitor 43 slowly, such that the DC to DC boost converter 25 fully discharges after turning off. An output section 35 having a pair of output terminals provides a stable DC connection for the destined load.

A system controller 47 generates command signals that are applied to the gate drivers 39 to control switching of the semiconductor switches 40. In order to maintain a stable output of the DC to DC boost converter 25, the system controller 47 gathers feedback data, primarily the input current and voltage and the output current and voltage. Other sensor data may also be acquired by the system controller 47, such as temperature, auxiliary voltage, local power supply voltages, etc.

While DC to DC converters of this type have proven to be very useful in low voltage environments, they are unsuitable in environments where it is necessary to boost input DC voltages to levels suitable for transmission over medium voltage (MV) and high voltage (HV) DC transmission lines. This is primarily due to the nature of how IGBTs and MOSFETs in the DC to DC boost converter operate. As will be appreciated, IGBTs are particularly suited to handle large currents. However, they suffer from slow turn-off characteristics, which limit the maximum operating frequency below 20 kHz, and a negative temperature coefficient, leading to thermal runaway. MOSFETs on the other hand act as variable resistors where, in the off-state, their resistance is very high, and in the transition to on-state, their resistance is linear. In the on-state, the MOSFETs saturate at a specified resistance known as the drain-source resistance ($R_{DS(on)}$) that is typically low. During each transition from off to on, a small amount of current passes through the linear resistance region, and is converted to heat. With higher switching frequencies, the MOSFETs must make more transitions per second, thereby losing more energy to heat. These switching losses put a physical limitation on the maximum operating frequency and power transmission capabilities of the MOSFETs, leading to the need for larger heatsinks, and greater numbers of MOSFETs. This of course results in increased costs. As a result of these operating frequency and power transmission limits, DC to DC converters with enough power transfer to be of commercial value in the power transmission industry have, to-date, simply been unavailable. Not surprisingly, other techniques suitable for use in environments where it is necessary to provide DC output at a level suitable for transmission over MVDC and HVDC transmission lines have been employed.

For example, turning now to FIG. 2, a conventional 12-pulse converter for converting HVAC to HVDC is shown and is generally identified by reference numeral 200. As can be seen, the 12-pulse converter 200 comprises an input section 202 in the form of a three-phase bus. The input section 202 provides AC input to a transformer section 204 that steps up the AC input. The transformer section 204 comprises two star-connected three-phase transformers 214.

The common connection on the primary side of both transformers 214 is grounded to earth 212. The secondary sides of the transformers 214 deliver high voltage alternating current to a 12-pulse converter circuit 206 comprising a bank of twelve (12) thyristor units 216 that convert the high voltage AC into pulsating DC. The central connection of the 12-pulse converter circuit 206 is connected to earth ground 220 such that the DC voltage relative to earth is minimized.

The pulsating DC output of the 12-pulse converter circuit 206 is fed into a DC filter 208 comprising DC reactors 218 and a bank of capacitors 222. The DC filter 208 provides filtered and stable DC output to an output section 210 comprising a pair of DC output terminals 210 that are connectable to a MVDC or HVDC transmission line.

While the use of a 12-pulse converter to generate HVDC may be suitable in some scenarios, the approach falls short in others. One notable instance where the use of a 12-pulse converter is not a viable option is in the transmission of power from remote DC power plants that generate low-voltage DC power. Because the power generated at these power plants is DC and of low-voltage, using a 12-pulse converter requires the low-voltage DC firstly to be converted to three-phase AC using several micro-inverters, and then requires the AC to be stepped up to high voltage AC using a transformer before being fed into the 12-pulse converter. As will be appreciated, converting the low-voltage DC to AC and then stepping up the AC voltage complicates the process of power transmission by reducing efficiency and increasing implementation and transmission costs.

Another limitation that is inherent when using a 12-pulse converter for generating HVDC from a DC input is that converting the DC input to AC restricts transmission to low frequency. The power transmission industry has fixed itself on the use of low frequency transformers (50 to 60 Hz) as this is the grid frequency. As such, any deviation from grid frequency will prevent compatibility with the existing grids. It is well known in the art that operating a transformer at a higher frequency has many benefits, the first of which is transformer size—the higher the frequency, the smaller the transformer can be. Being able to use smaller transformers is advantageous in that smaller transformers can employ smaller cores, thereby reducing material and construction costs. On the contrary, the material cost, industrial equipment and processes, transportation and logistical costs attributed with designing, manufacturing and commissioning low frequency but large transformers to step the AC voltage to a level suitable for feeding into the 12-pulse converter is immensely huge.

As will be appreciated, improvements in DC to DC converters that allow low-voltage input DC voltages to be boosted to levels suitable for transmission over MVDC or HVDC transmission lines are desired. It is therefore an object to provide a novel DC to DC boost converter.

This background serves only to set a scene to allow a person skilled in the art to better appreciate the following description. None of the above discussion should necessarily be taken as an acknowledgement that this discussion is part of the state of the art or is common general knowledge.

BRIEF DESCRIPTION

It should be appreciated that this brief description is provided to introduce a selection of concepts in a simplified form that are further described below in the detailed description. This brief description is not intended to be used to limit the scope of the claimed subject matter.

Accordingly, in one aspect there is provided a DC to DC boost converter comprising: a bridge converter configured to receive a direct current (DC) input and to generate a resultant alternating current (AC) output, said bridge converter comprising a high-speed semiconductor switch bridge; a transformer configured to receive and step up the AC output of the bridge converter; and a rectifier configured to convert the stepped up AC output to a pulsating DC output.

In one or more embodiments, the DC to DC boost converter further comprises an output filter configured to filter and smooth the pulsating DC output. In one form, the output filter comprises a capacitor bank and resistor and inductor arrays.

In one or more embodiments, the DC to DC boost converter further comprises an input filter configured to attenuate harmonics in the DC input. In one form, the output filter comprises a capacitor bank and resistor and inductor arrays.

In one or more embodiments, the bridge converter is configured to switch at a frequency in the range of from about 100 kHz to about 500 kHz. In one form, the bridge converter comprises discrete power transistors arranged in an H-bridge configuration. Each discrete power transistor may have one or more of the following characteristics at a forward current of about 50 A and a gate voltage above 15V: switching losses of about 1 kW or less; total transition times per cycle of less than about 100 nanoseconds; forward losses of about 80 W or less; and on-resistance of about 0.03 ohms or less. In one form, each discrete power transistor is a silicon carbide metal oxide semiconductor field effect transistor.

In one or more embodiments, the transformer comprises a high-frequency boost transformer array. In one form, a reverse breakdown voltage of the rectifier is greater than a maximum output voltage of the boost transformer array. In one form, the transformer array has a secondary side having a pair of terminals and the rectifier comprises four diode arrays. In another form, the transformer array has a secondary side having a pair of terminals and a negative-tap and the rectifier comprises two diode arrays.

In one or more embodiments, the DC input is in the range of about 600V to about 1200V.

In one or more embodiments, the DC output is in the range of about 33 kV to about 230 kV.

According to another aspect there is provided, a DC to DC boost converter comprising: an input filter unit configured to receive a low voltage direct current (DC) input and to generate filtered and stabilized low voltage DC output; a bridge converter unit configured to receive the filtered and stabilized low voltage DC output and to generate low voltage alternating current (AC) output, the bridge converter unit comprising power transistors arranged to form one or more switch bridges, the power transistors exhibiting low switching losses at high switching frequencies and small total transition times per switching cycle; a transformer and rectifier unit configured to receive the low voltage AC output and to generate medium or high voltage pulsed DC output; and an output filter configured to receive the pulsed DC output and to generate filtered and stabilized medium or high voltage DC output.

In one or more embodiments, the bridge converter unit is configured to switch at a frequency in the range of from about 100 kHz to about 500 kHz.

In one or more embodiments, each power transistor has one or more of the following characteristics at a forward current of about 50 A and a gate voltage above 15V: switching losses of about 1 kW or less; total transition times per cycle of less than about 100 nanoseconds; forward losses of about 80 W or less; and on-resistance of about 0.03 ohms or less.

In one or more embodiments, the low voltage DC input is in the range of about 600V to about 1200V.

In one or more embodiments, the medium or high voltage DC output is in the range of about 33 kV to about 230 kV.

BRIEF DESCRIPTION OF THE DRAWINGS

Embodiments will now be described with reference to the accompanying drawings in which like reference characters are used to indicate like components and in which.

DETAILED DESCRIPTION

Figure 1:
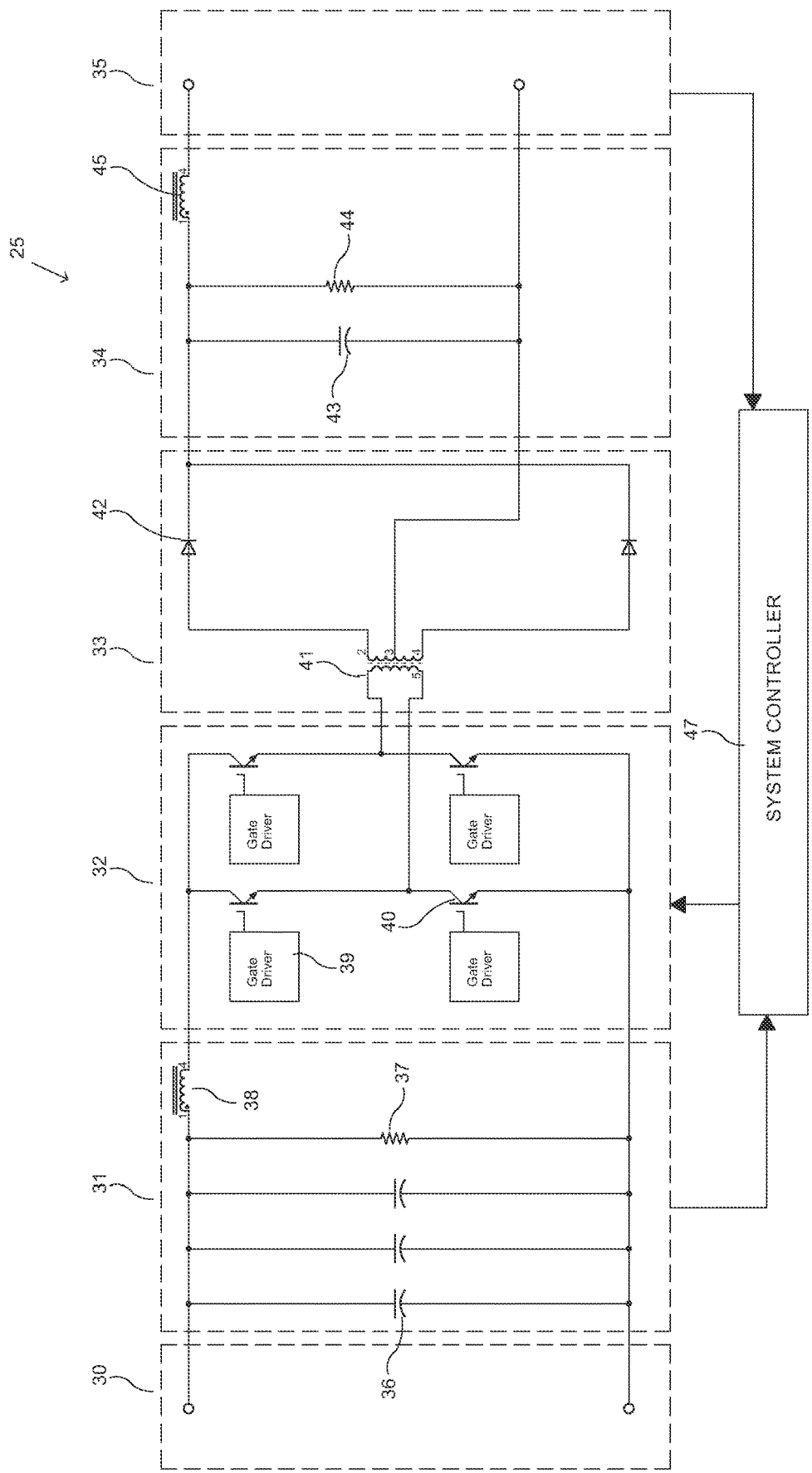
FIG. 1 is a schematic of a prior art DC to DC boost converter.
Figure 2:
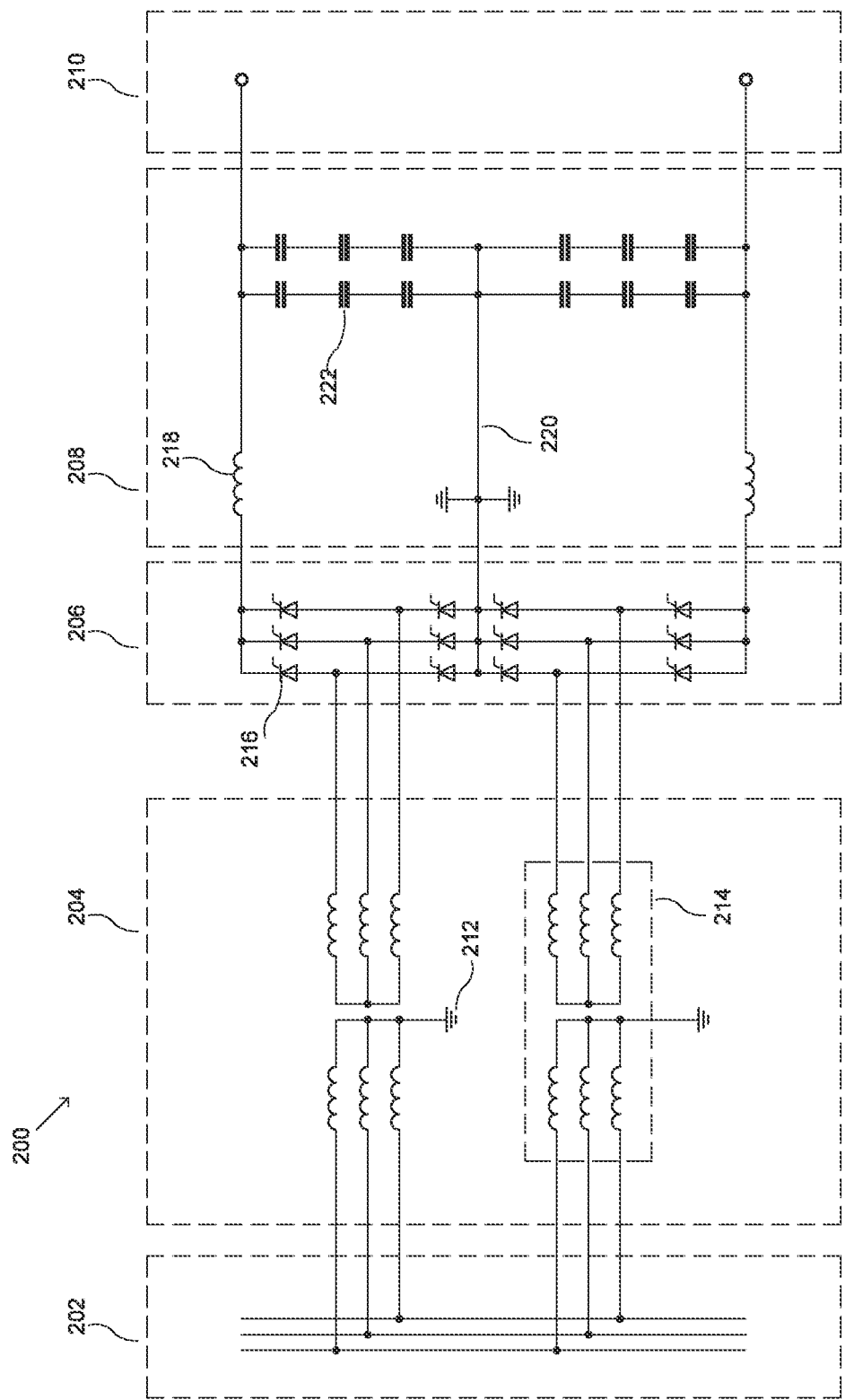
FIG. 2 is a schematic of a prior art 12-pulse converter.

The foregoing brief description, as well as the following detailed description of certain examples will be better understood when read in conjunction with the accompanying drawings. As used herein, a feature, structure, element, component etc. introduced in the singular and preceded by the word "a" or "an" should be understood as not necessarily excluding the plural of the features, structures, elements, components etc. Further, references to "one example" or "one embodiment" are not intended to be interpreted as excluding the existence of additional examples or embodiments that also incorporate the described features, structures, elements, components etc. Reference herein to "example" means that one or more feature, structure, element, component, characteristic and/or operational step described in connection with the example is included in at least one embodiment and/or implementation of the subject matter according to the subject disclosure. Thus, the phrases "an example," "another example," and similar language throughout the subject disclosure may, but do not necessarily, refer to the same example. Further, the subject matter characterizing any one example may, but does not necessarily, include the subject matter characterizing any other example.

Unless explicitly stated to the contrary, examples or embodiments "comprising" or "having" or "including" a feature, structure, element, component etc. or a plurality of features, structures, elements, components etc. having a particular property may include additional features, structures, elements, components etc. not having that property. Also, it will be appreciated that the terms "comprises", "has", "includes" means "including but not limited to" and the terms "comprising", "having" and "including" have equivalent meanings.

As used herein, the term "and/or" can include any and all combinations of one or more of the associated listed features, structures, elements, components or other subject matter.

Reference herein to "configured" denotes an actual state of configuration that fundamentally ties the feature, structure, element, component or other subject matter to the physical characteristics of the feature, structure, element, component or other subject matter preceding the phrase "configured to." Thus, "configured" means that the feature, structure, element, component or other subject matter is designed and/or intended to perform a given function. Thus, the use of the term "configured" should not be construed to mean that a given feature, structure, element, component or other subject matter is simply capable of performing a given function but that the feature, structure, element, component or other subject matter is specifically selected, created, implemented, utilized, and/or designed for the purpose of performing the function.

It will be understood that when a feature, structure, element, component or other subject matter is referred to as being "connected" to another feature, structure, element, component or other subject matter, that feature, structure, element, component or other subject matter can be directly connected to the other feature, structure, element, component or other subject matter or intervening features, structures, elements, components or other subject matter may also be present. In contrast, when a feature, structure, element, component or other subject matter is referred to as being "directly connected" to another features, structures, elements, components or other subject matter, there are no intervening features, structures, elements, components or other subject matter present.

As used herein, the terms "approximately" and "about" represent an amount or condition close to the stated amount or condition that results in the desired function being performed or the desired result being achieved. For example, the terms "approximately" and "about" may refer to an amount or condition that is within engineering tolerances to the precise value or condition specified that would be readily appreciated by a person skilled in the art.

In the following description, reference is made to low-voltage, medium voltage and high voltage. For reference and as will be adopted in the subject disclosure, the American National Standards Institute (ANSI) classifies voltages below 600V as low-voltage, voltages between 600V to 69 kV as medium voltage, and voltages between 69 kV to 230 kV as high voltage.

Also in the following description, embodiments of a DC to DC boost converter are described. In general, the DC to DC boost converter comprises a bridge converter configured to receive a DC input and to generate resultant alternating current (AC) output. The bridge converter comprises a high-speed semiconductor switch bridge. A transformer is configured to receive and step up the AC output of the bridge converter. A rectifier is configured to convert the stepped up AC output to a pulsating DC output.

The DC to DC boost converter is particularly suited for use in conjunction with remote DC power plants or sources such as solar farms as it allows low-voltage DC generated at these remote power plants to be stepped up to a level suitable for transmission over MVDC or HVDC transmission lines avoiding the problems associated with using a 12-pulse converter described previously. Further specifics concerning the DC to DC boost converter will now be described.

Figure 3:
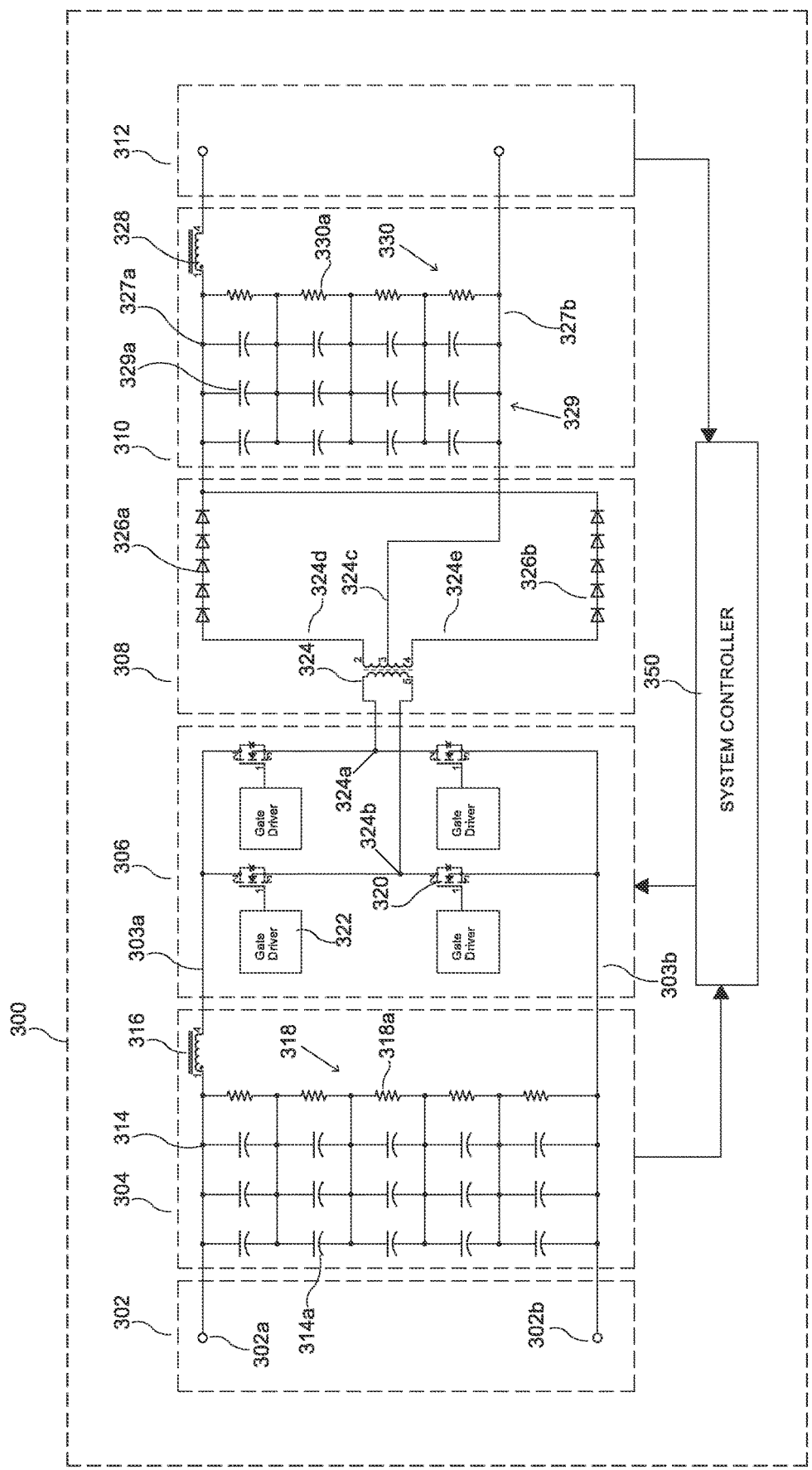
FIG. 3 is a schematic of an exemplary DC to DC boost converter in accordance with the subject disclosure.

Turning now to FIG. 3, an exemplary DC to DC boost converter is shown and is generally identified by reference numeral 300. In this embodiment, the DC to DC boost converter 300 is suitable for boosting lower voltage DC input to medium voltage or high voltage DC output. As can be seen, the DC to DC boost converter 300 comprises an input unit 302 configured to receive DC input, an input filter unit 304 configured to filter and stabilize the DC input, a bridge converter unit 306 configured to convert the stabilized DC input to an alternating current (AC) sinusoidal wave, a transformer-rectifier unit 308 configured to step up the AC sinusoidal wave and to convert the stepped up AC sinusoidal wave to pulsating medium voltage or high voltage DC output, an output filter unit 310 configured to filter and smooth the pulsating medium voltage or high voltage DC output, and an output unit 312 configured to output the resultant medium voltage or high voltage DC to a destined load such as a MVDC or HVDC transmission line. A system controller 350 is communicatively coupled to the input filter unit 304, the bridge converter unit 306 and the output unit 312.

In this embodiment, the DC to DC boost converter 300 is configured to be used with a remote DC power plant, such as a solar farm that generates DC power in the range of about 600V to about 1200V, and boosts the input DC to a level in the range of about 33 kV to about 230 kV. The DC to DC boost converter 300 also has a power input range between about 50 kW and about 200 kW.

The input section 302 of the DC to DC boost converter 300 comprises a pair of input terminals 302a and 302b at the terminal ends of input DC rails 303a and 303b. The input terminals 302a and 302b are configured to be readily connected to the remote DC power source in order to receive the DC input to be boosted.

The input filter unit 304 comprises a capacitor bank 314 electrically connected across the input DC rails 303a and 303b, a resistor array 318 that is electrically connected across the input DC rails 303a and 303b in parallel with the capacitor bank 318, and an inductor array 316 electrically in series with the input DC rail 303a. Although the capacitor bank 314 is shown as comprising a 5×3 array of capacitors 314a and the resistor array 318 is shown as comprising five resistors 318a in series, this is for ease of illustration only. As will be appreciated by those of skill in the art, the capacitor bank 314 and the resistor array 318 will typically include significantly more capacitors 314a and resistors 318a than shown. The number of capacitors 314a and resistors 318a that are employed is determined, for example, by the type(s) of capacitors selected (polypropylene film, ceramic etc.), and the anticipated DC input voltage, DC input power, and DC input power stability. Likewise, although the inductor array 316 is shown as comprising a single inductor, this again is for ease of illustration only. As will be appreciated by those of ordinary skill in the art, the inductor array 316 will typically include more inductors.

The input filter unit 304 is configured to attenuate (or reduce) electromagnetic interference (EMI) and stabilize the DC input. The input filter unit 314 is further configured to provide the necessary capacity to handle instantaneous load fluctuations. The resistors 318a of the resistor array 118 serve as voltage dividers to ensure that the total voltage is equally distributed across each capacitor 314a, and as bleeder resistors to discharge electric charge stored in the capacitors 314a of the capacitor bank 314 when the DC to DC boost converter 300 is not in use, thereby reducing the risk of leftover charge, which may pose a potential shock hazard.

In this embodiment, the bridge converter unit 306 comprises a high-speed semiconductor switch bridge. As illustrated, the switch bridge comprises four (4) discrete power transistors 320 arranged in an H-bridge configuration connected across the DC rails 303a and 303b. The power transistors 320 are operable in either a hard-switch or soft-switch mode to deliver power efficiently. While only four (4) power transistors 320 are shown to create the H-bridge, those of skill in the art will appreciate that this is for the purpose of simplifying the illustration. As is known, it is common industry practice to use multiple transistors in parallel to achieve higher efficiencies in power electronic applications and a comparable practice is employed in the subject DC to DC boost converter 300.

A gate driver 322 is associated with each power transistor 320. The gate drivers 322 respond to input signals from the system controller 350 and provide gate control signals to their associated power transistor 320 to enable the power transistor to perform its switching function all while maintaining adequate voltage isolation between the system controller 350 and the bridge converter unit 306.

The power transistors 320 exhibit a number of characteristics that make them particularly suited for use in the DC to DC boost converter 300. In particular, in this embodiment the power transistors 320 exhibit low switching losses at high switching frequencies to limit energy loss in the form of heat, a high drain to source voltage limit, a low drain to source on-resistance and a small total transition time per switching cycle ($T_{rise}+T_{fall}$). For example, when operating at a switching frequency of at least 100 kHz, a forward current of about 50 A and a gate (switching) voltage of about 15V or higher, power transistors 320 having one or more of the following characteristics are employed: (i) switching losses of about 1 kW or less, (ii) total transition times per cycle of less than about one-hundred (100) nanoseconds, (iii) forwarded losses of about 80 W or less, and (iv) an on-resistance of about 0.03 ohms or less. Silicon Carbide (SiC) metal oxide semiconductor field effect transistors (MOSFETs) are suitable power transistors although those of skill in the art will appreciate that alternative power transistors having similar or better (lower switching losses and shorter total transition times) operating characteristics can be used.

The transformer-rectifier unit 308 comprises a high frequency boost transformer array 324 and a rectifier. The terminals 324a and 324b on the primary side of the boost transformer array 324 are connected to the H-bridge, with each terminal 324a, 324b being connected a different leg of the H-bridge between a pair of the power transistors 320. The boost transformer array 324 has a negative tap 324c, which functions as the common.

Figure 6:
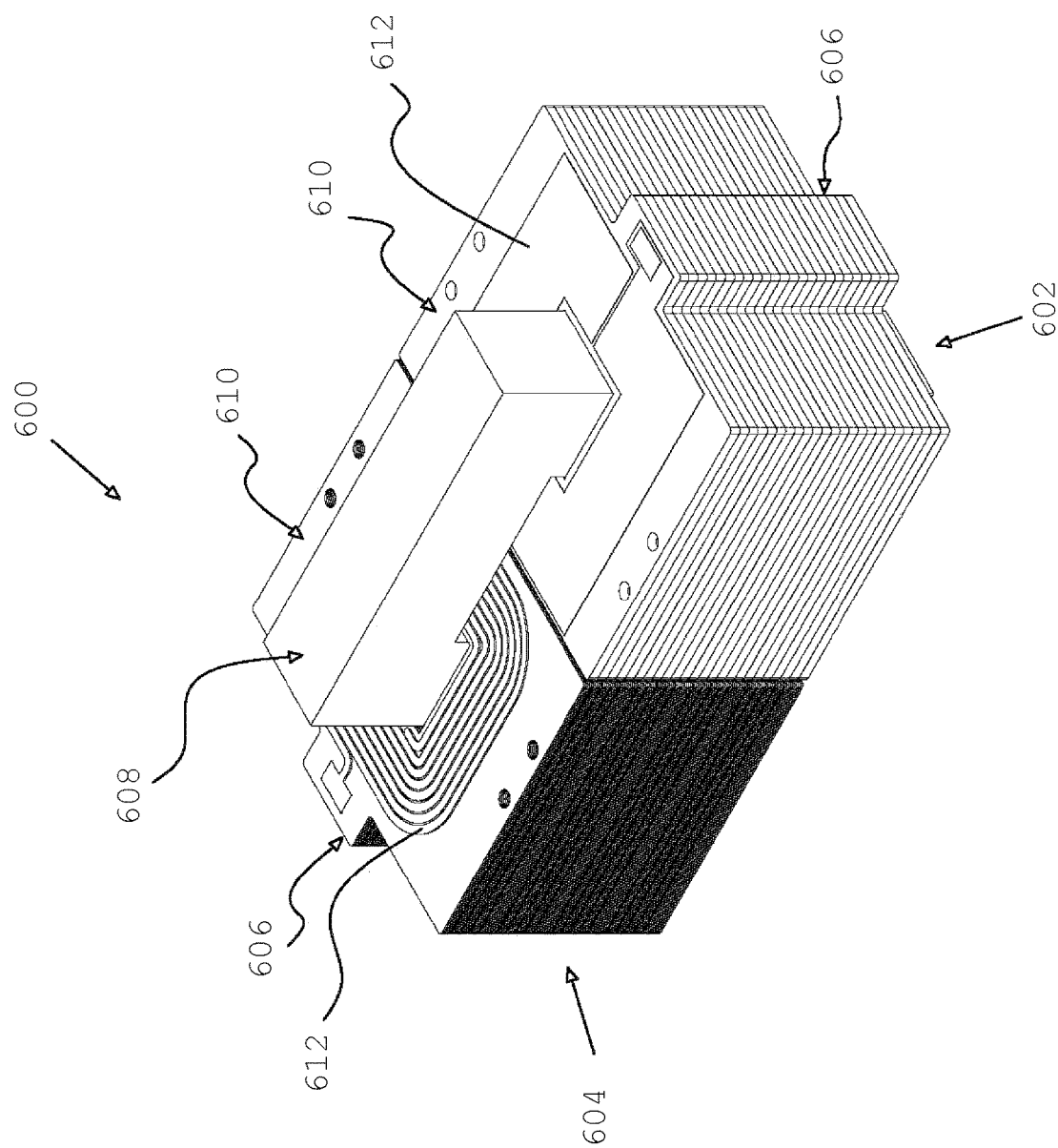
FIG. 6 is a perspective view of a transformer of the exemplary DC to DC boost converter shown in FIG. 3.

In this embodiment, the boost transformer array 324 is selected to accommodate 50 kW total boost power. Rather than employing a single larger transformer rated for 50 kW, a plurality of smaller transformers combined in parallel, in this case four (4) transformers, are employed. This allows the total core volume that is needed for higher power capacity to be achieved while maintaining winding length so as to avoid increased winding resistance and while maintaining core surface area for natural cooling. The parallel transformers also allow the current in each transformer to be reduced thereby to reduce copper losses. One of the transformers is shown FIG. 6 and is generally identified by reference character 600. The primary and secondary windings 602 and 604, respectively, of each transformer 600 comprise a printed circuit board (PCB) stack 606 through which the transformer core 608 passes. Each printed circuit board 610 comprises a thin copper coil 612, having a high surface area to volume that allows the skin effect resulting from operating at a high frequency to be taken advantage of, disposed on opposite sides of an electrically insulative substrate formed of FR4 or other suitable material. Solder masks overlie each copper coil 612. A polyimide film is used to insulate each PCB in the stack. Electrically insulative layers formed of FR4 or other suitable material are also provided at the top and bottom of each stack to provide sufficient electrical isolation between the coil and the core. Further specifics of the transformers 600 are described in U.S. Provisional Application No. 63/163,604 filed on Mar. 19, 2021, the relevant portions of which are incorporated herein by reference.

The rectifier is a full-wave rectifier comprising a pair of diode arrays 326a and 326b. Each diode array is electrically connected at one end to a respective terminal 324d, 324e on the secondary side of the boost transformer array 324. The other ends of the diode arrays 326a and 326b are electrically connected to an output DC rail 327a. Each diode array is configured to convert half cycles of the sinusoidal wave received from the secondary side of the boost transformer array 324 into pulsating DC output that is combined on the output DC rail 327a. Each diode array may be a single series diode array comprising one or more diodes or may comprise multiple series diode arrays connected in parallel, again with each series diode array comprising one or more diodes.

In this embodiment, each diode array comprises five (5) diodes that are electrically connected in series. The diodes are selected to have high reverse-bias breakdown, high current capabilities, fast recovery periods, low forward voltage drops, good heat dissipation and good breakdown immunity. As mentioned above, the diode arrays may have more than or less than five diodes. The number of diodes in the diode arrays is limited by the condition that the reverse breakdown voltages of the diode arrays are greater than the boost voltage from the boost transformer array 324. In other words, if diodes with lower reverse breakdown voltages are employed, more diodes are required, and if diodes with higher reverse breakdown voltages are employed, fewer diodes are required. For example, if each diode has a reverse breakdown voltage of 8 kV and the output of the DC to DC boost converter 330 is 33 kV, five diodes are required. Alternatively, if each diode has a reverse breakdown voltage of 24 kV and the output of the DC to DC boost converter 330 is 33 kV, two diodes are required. The number of diodes connected in series and/or parallel is a function of the reverse breakdown voltage of the selected diodes and the maximum forward currents the selected diodes permit.

The output filter unit 310 comprises a capacitor bank 329 electrically connected across output DC rail 327a and output DC rail 327b that leads to the negative tap 324c of the boost transformer array 324, a resistor array 330 that is electrically connected across the output DC rails 327a and 327b in parallel with the capacitor bank 329, and an inductor array 328 electrically in series with the output DC rail 327a. Although the capacitor bank 329 is shown as comprising a 4×3 array of capacitors 329a and the resistor array 330 is shown as comprising four (4) resistors 330a in series, this is for ease of illustration only. As will be appreciated by those of skill in the art, the capacitor bank 329 and the resistor array 330 will typically include significantly more capacitors 329a and resistors 330a than shown. The number of capacitors 329a and resistors 330a that are employed is determined, for example, by the type(s) of capacitors selected (polypropylene film, ceramic etc.) used, and the anticipated DC output voltage, the DC output power, DC output stability. Likewise, although the inductor array 328 is shown as comprising a single inductor, again this is for ease of illustration only. As will be appreciated by those of skill in the art, the inductor array 328 will typically include more inductors.

The output filter unit 310 is configured to receive the pulsating DC output from the rectifier and smooth ripples and stabilize the DC output. The output filter unit 310 is further configured to provide the necessary capacity to overcome any instantaneous load fluctuations. The resistor array 330 serves as a bleeder resistor that discharges the capacitor bank 329 slowly when the DC to DC boost converter 300 is turned off. In this embodiment, the resistor array 330 also functions as a voltage divider to thereby ensure that the voltage across each capacitor 329a in the capacitor bank 329 remains the same.

The output unit 312 comprises two output terminals 312a and 312b at the terminal ends of the output DC rails 327a and 327b. The output terminals are readily connectable to a MVDC or HVDC transmission line to deliver boosted DC power thereto.

The system controller 350 generates signals that are applied to the gate drivers 322 to control switching of the power transistors 320. In order to maintain a stable output of the DC to DC boost converter 300, the system controller 350 gathers feedback data, primarily the input current and voltage and the output current and voltage, from the input filter unit 304 and the output unit 312. Other sensor data may be acquired by the system controller 350, such as temperature, auxiliary voltage, local power supply voltages, etc.

When the input terminals 302a and 302b are connected to the remote DC power source and an input DC voltage appears across the input DC rails 303a and 303b, the input DC voltage is filtered and stabilized by the input filter unit 314, which attenuates unwanted harmonics before the input DC voltage appears at the bridge converter unit 306. At the bridge converter unit 306, the input DC voltage is converted to an AC sinusoidal wave. This is achieved by signaling the gate drivers 322 via the system controller 350 causing the gate drivers to turn selected pairs of the power transistors 320 on and off at a frequency in the range of from about 100 kHz to about 500 kHz.

The output AC sinusoidal wave of the bridge converter unit 306 is applied to the primary side of the boost transformer array 324, which in turn generates a stepped up AC sinusoidal wave that appears on the secondary side of the boost transformer array 324. The rectifier 326 then converts the stepped up sinusoidal wave to pulsating DC output that is applied to the output filter unit 310. The output filter unit 310 smooths the pulsating DC signal to remove rippling as well as stabilizes the DC output so that a stable boosted DC voltage appears across the output terminals 312a and 312b.

The DC to DC boost converter 300 may be used as a standalone unit to boost input DC from a lower voltage to a higher voltage. The DC to DC boost converter may however, be used in series with other similar DC to DC boost converters to enable higher DC output voltages to be achieved, in parallel with other DC to DC boost converters to enable higher DC output currents to be achieved, or in series-parallel combinations with other DC to DC boost converters to enable both higher DC output voltages and higher DC output currents to be achieved.

Figure 4:
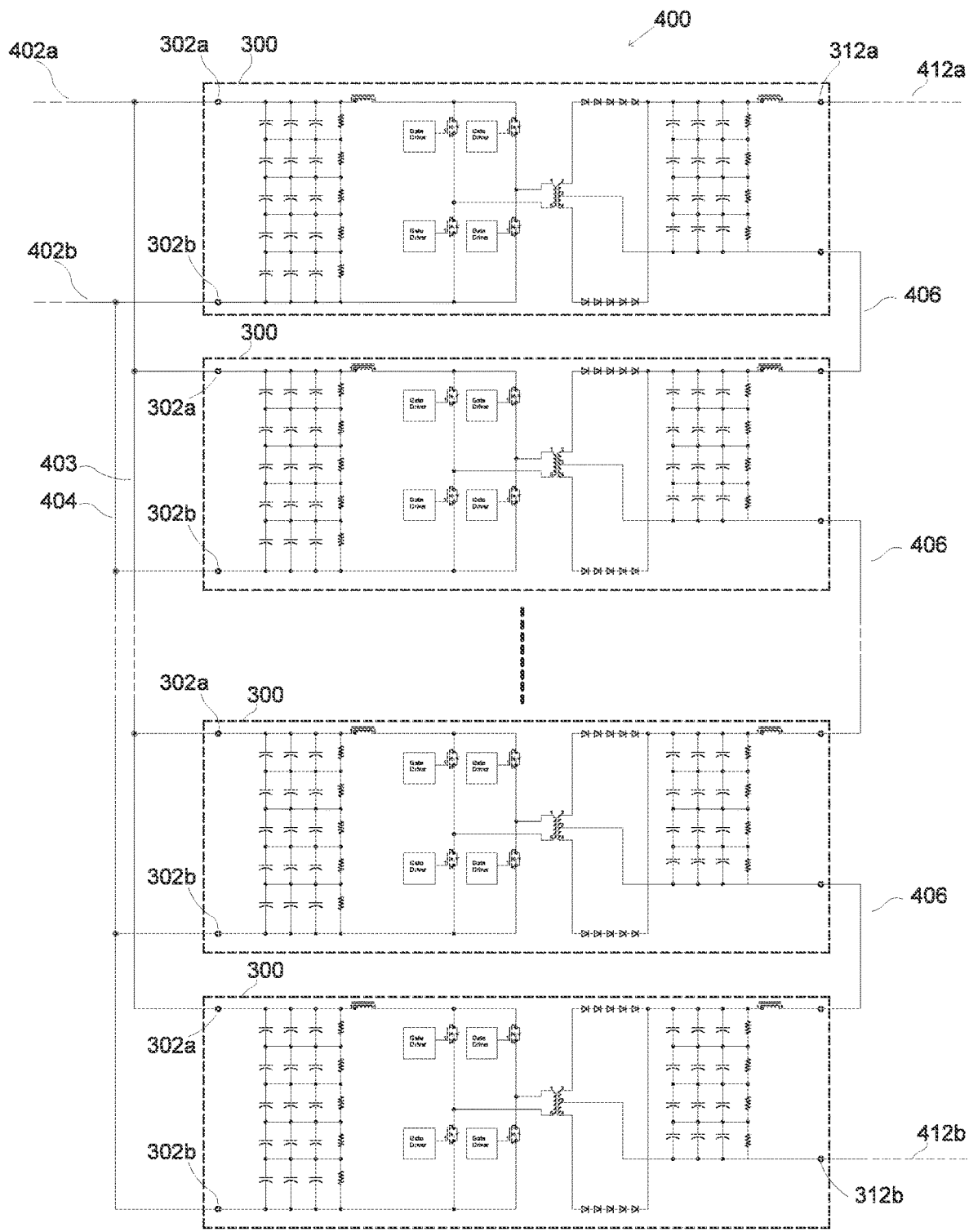
FIG. 4 is a schematic of an exemplary DC to DC boost converter array comprising a plurality of DC to DC boost converters of the type shown in FIG. 3.

For example, turning now to FIG. 4, a DC to DC boost converter array 400 that comprises a plurality of boost converters 300 is shown. As will be appreciated, although only four boost converters 300 are illustrated, the DC to DC boost converter array 400 may include fewer or more DC to DC boost converters depending on the desired output DC voltage of the DC to DC boost converter array 400.

As can be seen at the input side of the DC to DC boost converter array 400, each of the DC to DC boost converters 300 in the array receives the same DC input. To achieve this, the input terminals 302a of the DC to DC boost converters 300 are electrically connected in parallel to a line 403 leading to the input terminal 402a of the array and the input terminals 302b of the DC to DC boost converters 300 are electrically connected in parallel to a line 404 leading to the input terminal 402b of the array. At the output side of the DC to DC boost converter array 400, the output terminals of the DC to DC boost converters are electrically connected in series by lines 406 with the exception of the output terminal 312a of the first DC to DC boost converter 300 in the array, which leads to the output terminal 412a of the array, and output terminal 312b of the last DC to DC boost converter 300 in the array, which leads to the output terminal 412b of the array.

Those of skill in the art will appreciate that the DC to DC boost converters in the array may be used in a variety of series-parallel combinations to achieve the desired DC output. This allows the DC to DC boost converters to be combined as needed to suit individual DC power plants, thus removing the need for a custom solution for each new DC power plant project. Furthermore, any upsizing of an existing DC power plant, such as the addition of new solar arrays to an existing solar farm, or addition of new battery storage units to an existing storage system, only requires the addition of DC to DC boost converters to the existing DC to DC boost converter array in order to support the increased power generation of the DC power plant.

The DC to DC converters provide further advantages. When used in conjunction with remote DC power plants such as solar farms, the DC to DC converters enable remote DC power plants to transfer their power over a MVDC or HVDC transmission line without requiring the low-voltage DC generated by the DC power plants to be converted to AC power. This expands the transmission distance for such DC power plants while keeping power loss at a minimum. This effectively allows solar farms to be placed in the ideal geographical locations for optimum sunlight, without the distance to its destined grid load becoming an overriding factor in the design process.

Figure 5:
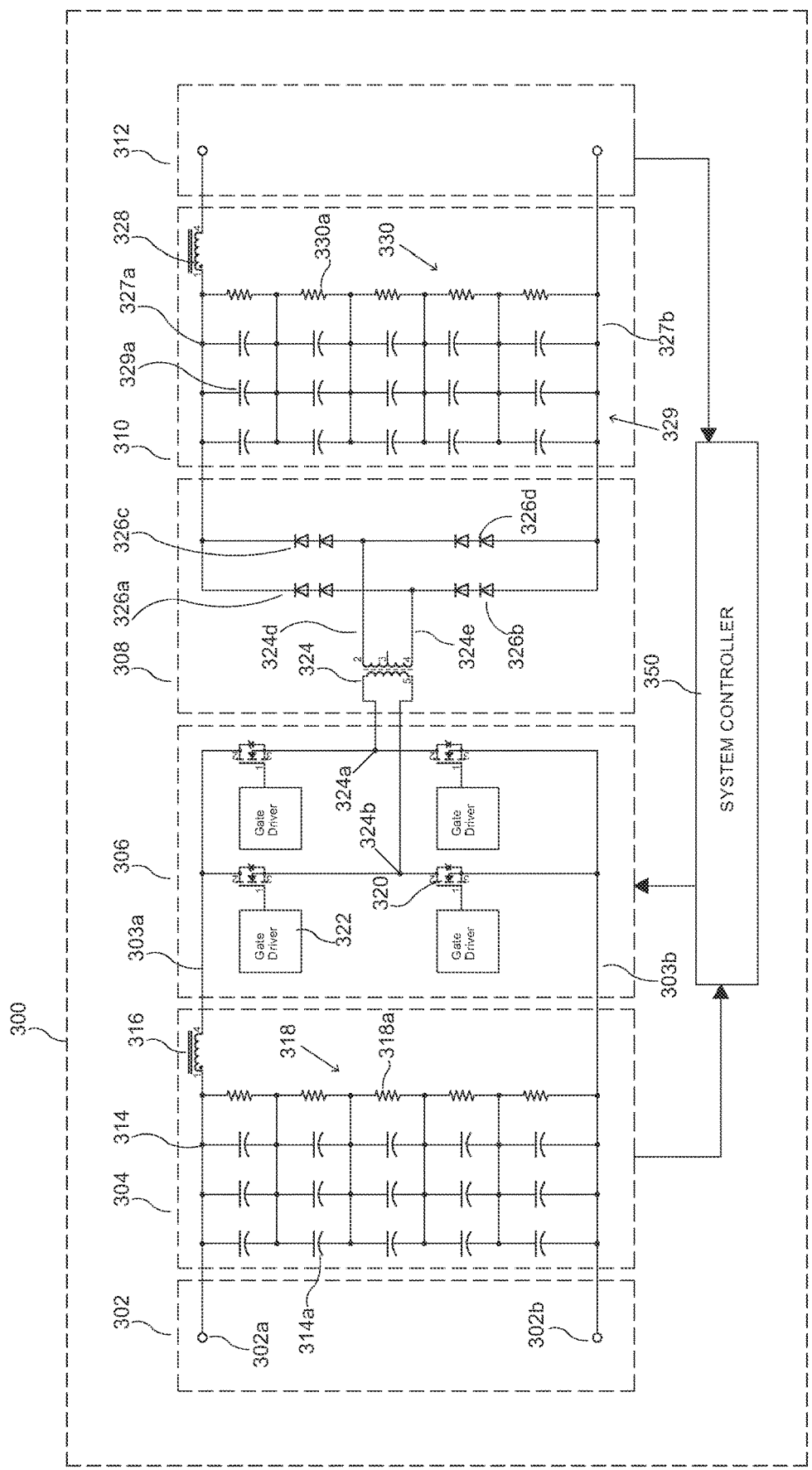
FIG. 5 is a schematic of an alternative DC to DC boost converter in accordance with the subject disclosure.

Although the DC to DC boost converter 300 has been described above as employing a negative-tapped boost transformer array, alternatives are available. For example, the negative-tapped boost transformer array may be replaced with a regular transformer array as shown in FIG. 5. For ease of illustration, in FIG. 5 like reference numbers will be used to indicate like components. As can be seen, in this embodiment, the boost transformer array 324 has no negative tap. The rectifier is a full-bridge rectifier comprising four (4) diode arrays 326a, 326b, 326c, and 326d. Each diode array is shown as comprising two (2) diodes electrically connected in series. Diode arrays 326a and 326 are electrically connected in a series arrangement across the output DC rails 327a and 327b. Diode arrays 326c and 326d are electrically connected in a series arrangement across the output DC rails 327a and 327b in parallel with the diode arrays 326a and 326b. At the secondary side of the boost transformer array 324, terminal 324d is connected to the series arrangement of the diode arrays 326c and 326d at a point between the diode arrays 326c and 326d and terminal 324e is connected to the series arrangement of the diode arrays 326a and 326b at a point between the diode arrays 326a and 326b. The diode arrays are configured to convert cycles of the AC sinusoidal wave received from the secondary side of the boost transformer array 324 into pulsating DC output that is combined on the output DC rail 327a.

Similar to the previous embodiment, the diodes are selected to have high reverse-bias breakdown, high current capabilities, fast recovery periods, low forward voltage drops, good heat dissipation and good breakdown immunity. The number of diodes in the diode arrays is limited by the condition that the reverse breakdown voltages of the diode arrays are greater than the boost voltage from the boost transformer array 324. In other words, if diodes with lower reverse breakdown voltages are employed, more diodes are required, and if diodes with higher reverse breakdown voltages are employed, fewer diodes are required.

Depending on specific application requirements, different topologies for the DC to DC boost converter may be employed. These topologies include, but are not limited to, flyback, two-switch flyback, quasi-resonant flyback, active clamp forward, single switch forward, two switch forward, push-pull, current-fed push-pull, half-bridge, LLC half-bridge, and phase-shifted full-bridge topologies.

Although embodiments have been described above with reference to the accompanying drawings, those of skill in the art will appreciate that variations and modifications may be made.

What is claimed is:

1. A DC to DC boost converter to step up low voltage direct current (DC) input to a level suitable for transmission over medium voltage (MV) or high voltage (HV) transmission lines, the DC to DC boost converter comprising:
   a bridge converter configured to receive a direct current (DC) input and to generate a resultant alternating current (AC) output, the bridge converter comprising a high-speed semiconductor switch bridge that includes a plurality of discrete power transistors, wherein the bridge converter is configured to switch at a frequency of at least 100 kHz, and wherein each discrete power transistor at least has switching losses of about 1 kW or less and total transition times per cycle of less than about 100 nanoseconds;
   a high frequency boost transformer array comprising a plurality of transformers electrically connected in parallel, the transformer array configured to receive and step up the AC output of the bridge converter; and
   a rectifier configured to convert the stepped up AC output to pulsating DC output having a voltage of at least about 33 kV.

2. The DC to DC boost converter of claim 1, further comprising an output filter configured to filter and smooth the pulsating DC output.

3. The DC to DC boost converter of claim 2, wherein the output filter comprises a capacitor bank and resistor and inductor arrays.

4. The DC to DC boost converter of claim 1, further comprising an input filter configured to attenuate harmonics in the DC input.

5. The DC to DC boost converter of claim 4, wherein the input filter comprises a capacitor bank and resistor and inductor arrays.

6. The DC to DC boost converter of claim 1, wherein the bridge converter is configured to switch at a frequency in the range of from about 100 kHz to about 500 kHz.

7. The DC to DC boost converter of claim 6, wherein the discrete power transistors are arranged in an H-bridge configuration.

8. The DC to DC boost converter of claim 7, wherein each discrete power transistor also has one or more of the following characteristics at a forward current of about 20 A and a gate voltage above 10 V:
   switching losses of about 1 kW or less;
   (i) forward losses of about 100 W or less; and
   (ii) on-resistance of about 0.1 ohms or less.

9. The DC to DC boost converter of claim 8, wherein each discrete power transistor is a silicon carbide metal oxide semiconductor field effect transistor.

10. The DC to DC boost converter of claim 1, wherein the transformer array has a secondary side having a pair of terminals and the rectifier comprises four diode arrays.

11. The DC to DC boost converter of claim 1, wherein the transformer array has a secondary side having a pair of terminals and a negative-tap and the rectifier comprises two diode arrays.

12. The DC to DC boost converter of claim 1, wherein a reverse breakdown voltage of the rectifier is greater than a maximum output voltage of the boost transformer array.

13. The DC to DC boost converter of claim 1, wherein the DC input is in the range of about 600 V to about 1200 V.

14. The DC to DC boost converter of claim 1, wherein the DC output is in the range of about 33 kV to about 230 kV.

15. A DC to DC boost converter array comprising a plurality of DC to DC boost converters, each in accordance with claim 1, the DC to DC boost converters being electrically connected in a series arrangement.

16. A DC to DC boost converter array comprising a plurality of DC to DC boost converters, each in accordance with claim 1, the DC to DC boost converters being electrically connected in a parallel arrangement.

17. A DC to DC boost converter array comprising a plurality of DC to DC boost converters, each in accordance with claim 1, the DC to DC boost converters being electrically connected in a series and parallel arrangement.

18. The DC to DC boost converter of claim 1, wherein each transformer in said transformer array comprises a primary winding, a secondary winding and a transformer core, wherein each of said primary and secondary windings comprises a printed circuit board stack through which said transformer core passes, and wherein each printed circuit board of the printed circuit board stack comprises a high surface area thin copper coil winding thereon.

19. A DC to DC boost converter to step up low voltage direct current (DC) input to a level suitable for transmission over medium voltage (MV) or high voltage (HV) transmission lines, the DC to DC boost converter comprising:
  an input filter unit configured to receive a low voltage direct current (DC) input and to generate filtered and stabilized low voltage DC output;
  a bridge converter unit configured to receive the filtered and stabilized low voltage DC output and to generate low voltage alternating current (AC) output, the bridge converter unit comprising power transistors arranged to form one or more switch bridges, the power transistors exhibiting low switching losses at high switching frequencies and small total transition times per switching cycle and the bridge converter configured to switch at a frequency of at least 100 kHz, wherein each power transistor has the following characteristics at a forward current of about 50 A and a gate voltage above 15 V:
  switching losses of about 1 kW or less;
  (ii) total transition times per cycle of less than about 100 nanoseconds;
  (iii) forward losses of about 80 W or less; and
  (iv) on-resistance of about 0.03 ohms or less;
  a transformer array and rectifier unit configured to receive the low voltage AC output and to generate medium or high voltage pulsed DC output, the transformer array comprising a plurality of transformers electrically connected in parallel; and
  an output filter configured to receive the pulsed DC output and to generate filtered and stabilized medium or high voltage DC output having a voltage of at least about 33kV.

20. The DC to DC boost converter of claim 19, wherein the bridge converter unit is configured to switch at a frequency in the range of from about 100 kHz to about 500 kHz.

21. The DC to DC boost converter of claim 19, wherein the low voltage DC input is in the range of about 600 V to about 1200 V.

22. The DC to DC boost converter of claim 19, wherein the medium or high voltage DC output is in the range of about 33 kV to about 230 kV.

23. A DC to DC boost converter array comprising a plurality of DC to DC boost converters, each in accordance with claim 19, the DC to DC boost converters being electrically connected in a series arrangement.

24. A DC to DC boost converter array comprising a plurality of DC to DC boost converters, each in accordance with claim 19, the DC to DC boost converters being electrically connected in a parallel arrangement.

25. A DC to DC boost converter array comprising a plurality of DC to DC boost converters, each in accordance with claim 19, the DC to DC boost converters being electrically connected in a series and parallel arrangement.

26. The DC to DC boost converter of claim 19, wherein each transformer in said transformer array comprises a primary winding, a secondary winding and a transformer core, wherein each of said primary and secondary windings comprises a printed circuit board stack through which said transformer core passes, and wherein each printed circuit board of the printed circuit board stack comprises a high surface area thin copper coil winding thereon.

* * * * *